F. C. PERKINS.
OPTICAL ILLUSION DEVICE.
APPLICATION FILED JUNE 10, 1908.

909,450.

Patented Jan. 12, 1909.
2 SHEETS—SHEET 1.

Witnesses:
Gustav W. Hora.
Richard Sommer.

Inventor
Frank C. Perkins
by Geyer & Popp
Attorneys

F. C. PERKINS.
OPTICAL ILLUSION DEVICE.
APPLICATION FILED JUNE 10, 1908.
909,450.
Patented Jan. 12, 1909.
3 SHEETS—SHEET 2.
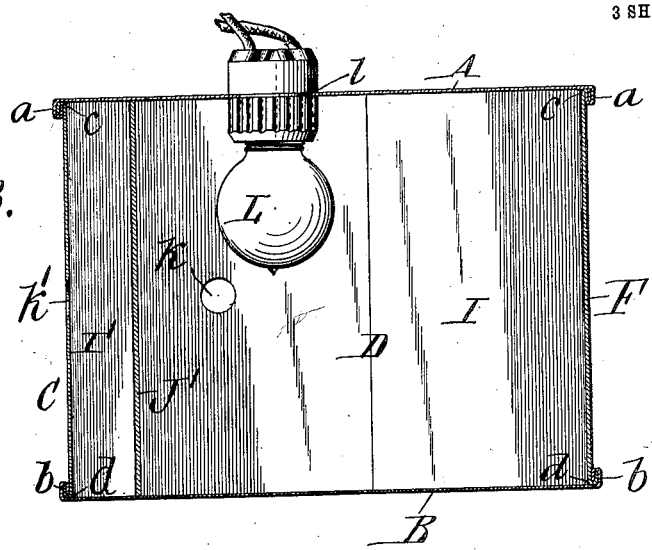
Fig. 3.
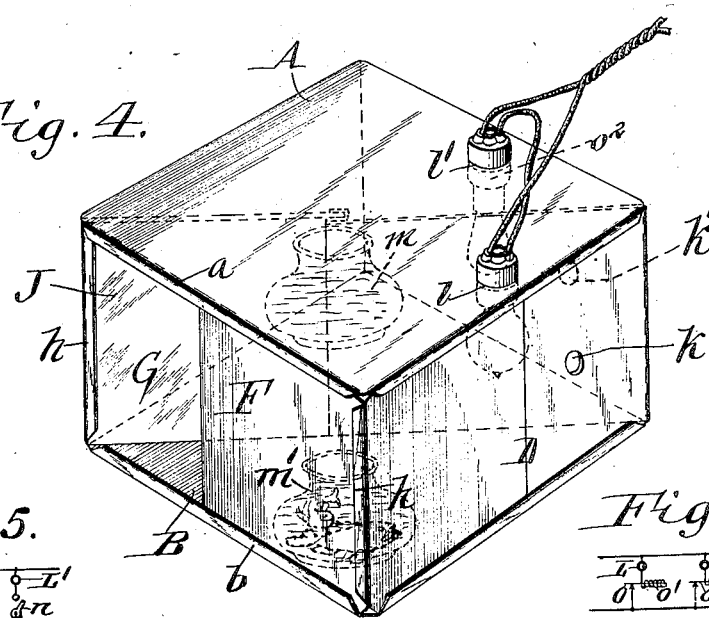
Fig. 4.
Fig. 5.
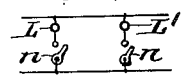
Fig. 6.
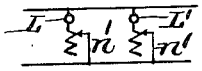
Fig. 9.
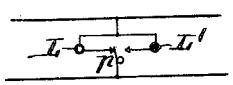
Fig. 8.
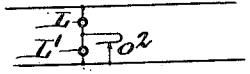
Fig. 7.
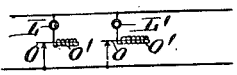
Witnesses:
Gustav W. Hora.
Richard Sommer.
Inventor
Frank C. Perkins
by Geyer & Pope
Attorneys F. C. PERKINS.
OPTICAL ILLUSION DEVICE.
APPLICATION FILED JUNE 10, 1908.
909,450.
Patented Jan. 12, 1909.
3 SHEETS—SHEET 3.
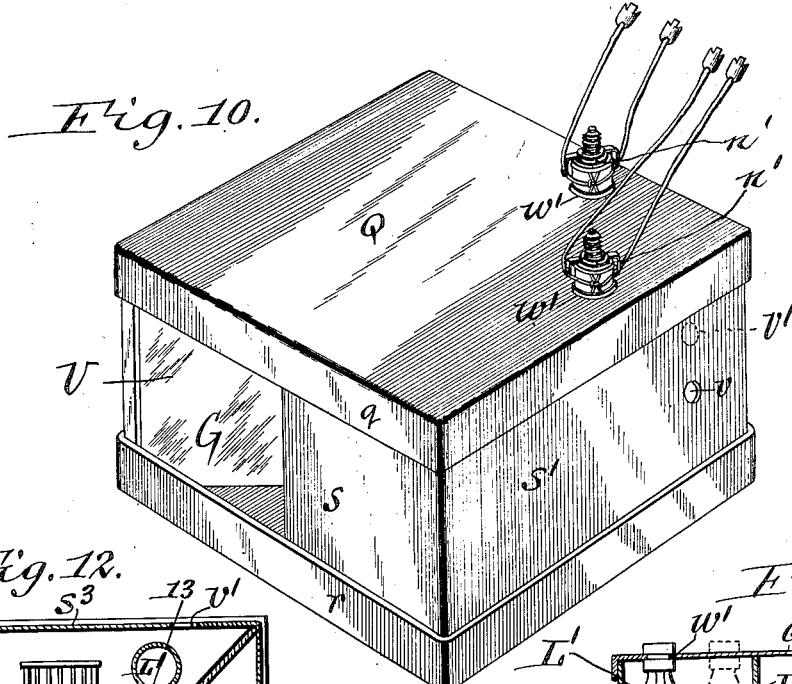
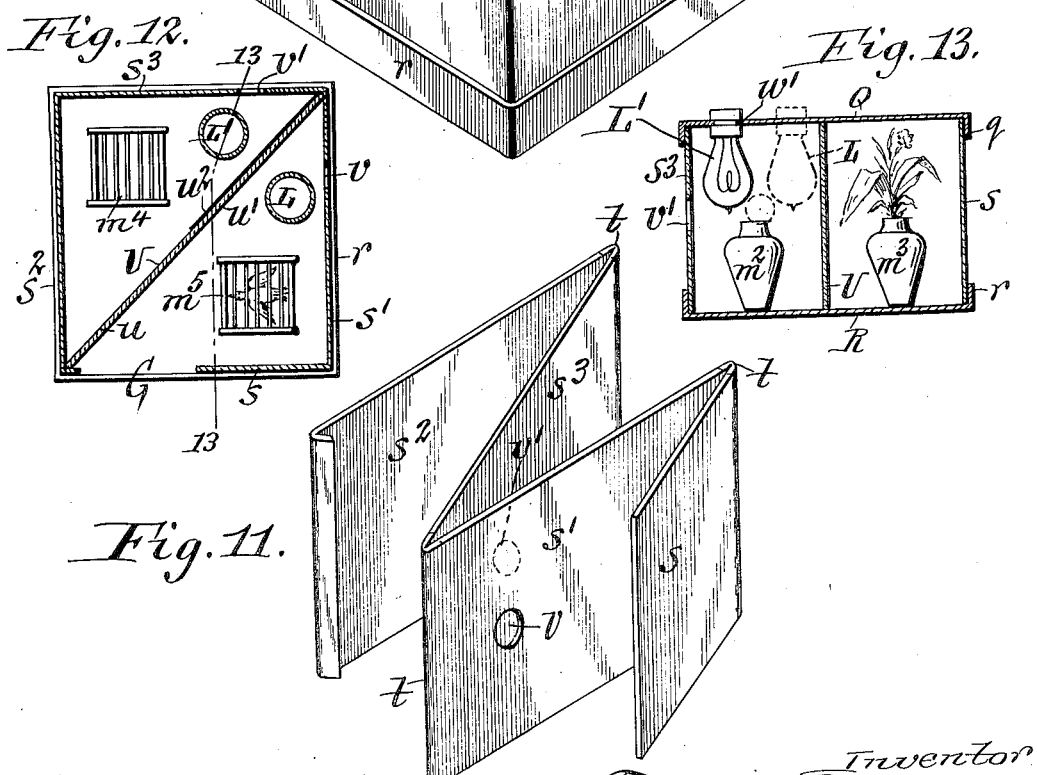

UNITED STATES PATENT OFFICE.

FRANK C. PERKINS, OF BUFFALO, NEW YORK.

OPTICAL ILLUSION DEVICE.

No. 909,450.

Specification of Letters Patent.

Patented Jan. 12, 1909.

Application filed June 10, 1908. Serial No. 437,641.

*To all whom it may concern:*

Be it known that I, FRANK C. PERKINS, a citizen of the United States, residing at Buffalo, in the county of Erie and State of New York, have invented a new and useful Improvement in Optical Illusion Devices, of which the following is a specification.

This invention relates to an optical illusion device by which it may be made appear that one object changes into another, or one object may be made to appear and disappear.

The object of this invention is to provide a simple and effective illusion device of this character which can be produced at low cost; which is so constructed that it can be readily assembled for use or dismembered and folded or stacked compactly for storing or shipping and in which the illumination is effected electrically and automatically.

Figure 1:
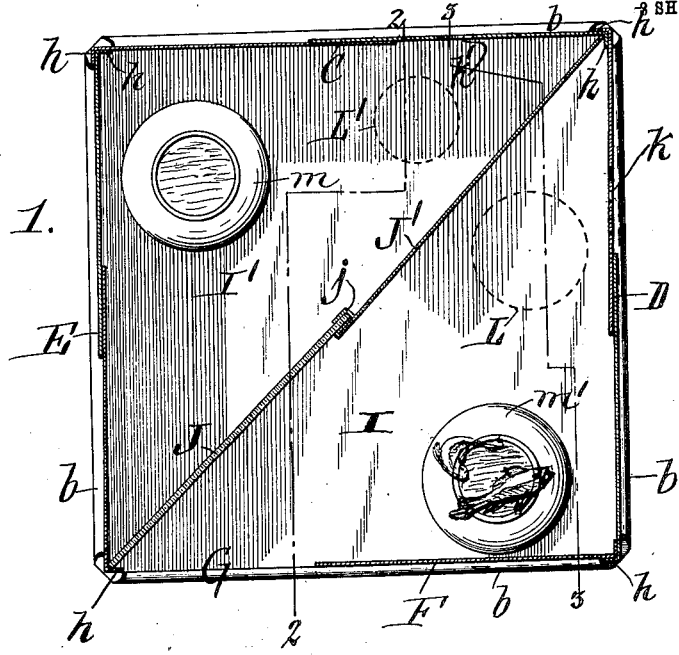
Figure 2:
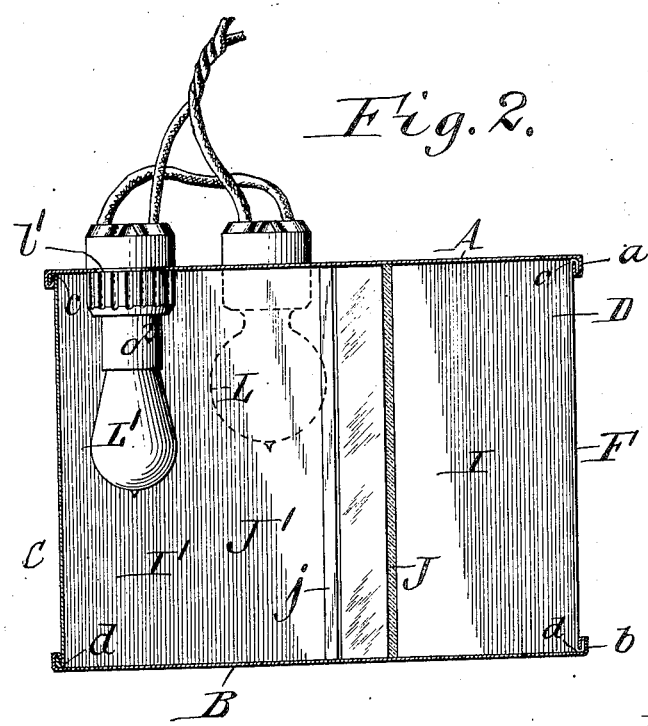

In the accompanying drawings consisting of 3 sheets: Figure 1 is a horizontal section of one form of my improved illusion device. Figs. 2 and 3 are vertical sections thereof in the correspondingly numbered lines in Fig. 1. Fig. 4 is a perspective view thereof. Figs. 5, 6, 7, 8 and 9 are electrical diagrams showing different ways of illuminating the illusion device. Fig. 10 is a similar view showing a modified construction of an illusion device. Fig. 11 is a similar view of the side walls of the last mentioned construction in a partly folded condition. Fig. 12 is a horizontal section of the construction shown in Fig. 10. Fig. 13 is a vertical section of the same in line 13—13, Fig. 12.

Similar letters of reference indicate corresponding parts throughout the several views.

The inclosing casing, housing or cabinet of my improved illusion device is preferably so constructed that it is collapsible or may be knocked down for convenience in storing and shipping. With this object in view the casing may be variously constructed, that shown in Figs. 1-4 comprising a horizontal top A and bottom B of rectangular form, an upright rear wall C, two upright side walls D, E arranged at the right and left sides of the housing, and an upright front wall F extending from one of the side walls, say D, inwardly about half way of the width of the housing leaving a sight opening G at the front of the casing adjacent to the left wall E. The sections of the casing are preferably constructed of sheet metal although any other suitable material may be used such as asbestos or paste board and the sections are detachably connected by providing the marginal parts or edges of the top and bottom sections with locking channels, grooves or folds $a$, $b$ which are adapted to receive hook shaped tongues or flanges $c$, $d$ at the upper and lower edges of the rear, side and front wall sections, said channels and tongues being engaged with each other by sliding the same lengthwise relatively to each other.

The vertical corners are preferably made tight by means of vertical flanges $h$ arranged on the corner edges of the wall sections and over lapping each other.

The front wall is preferably made in one piece but the rear and side walls are each preferably constructed in two normally overlapping pieces for convenience in packing and also to permit of opening the casing at the right side adjacent to the front right corner and at the rear side adjacent to the rear left corner for the purpose to be hereinafter described.

Arranged diagonally within the casing the full height thereof and extending from the front left corner to the right rear corner thereof is a partition which divides the casing into front and rear compartments I, I$^1$. The left half J of the partition opposite the sight opening of the casing is transparent and the right half J$^1$ opposite the front wall section F is opaque. The transparent part of the partition preferably consists of glass and the opaque part of sheet metal. the two parts being joined by a vertical groove $j$ formed on the left edge of the opaque partition section and receiving the inner opposing edge of the glass partition section.

The interior of the casing and also the opaque part of the partition are rendered non-reflecting by making the same of black or dark dull material such as charcoal or iron, by producing an oxidized copper finish on tin by blackening or otherwise preparing the same to prevent reflection of light.

Adjacent to the rear or right end of the partition, the right wall has an opening $k$ and the rear wall has an opening $k^1$ which openings lead from the exterior into the front and rear compartments, respectively, and permits of inserting a match, taper, candle or other light by hand into these compartments or withdrawing the same for the purpose either of illuminating these compartments or darkening the same. The top of the casing is also provided adjacent to the right or rear end of the partition with two openings $l$, $l^1$ which lead into the front and rear compartments. Detachably secured in these upper openings and arranged in the front and rear compartments, respectively, are two incandescent electric lamps L, $L^1$ whereby these compartments may be illuminated electrically.

Upon placing an object in one or the other of the compartments in the casing within range of the glass part of the partition and alternately illuminating the compartments, it will produce the illusion upon one looking into the casing through the sight opening that the object is appearing and disappearing.

When the rear compartment only is illuminated any object arranged within the same in rear of the glass part of the partition is visible to the spectator looking into the casing through the sight opening thereof but when the front compartment only is illuminated and the rear compartment is dark any article in rear of the glass partition is obscured and any article in the front compartment is reflected by the front side of the glass partition in the line of vision of the spectator at the sight opening and is made to appear as if located behind the glass partition.

As shown in Figs. 1 and 4, an empty bowl or aquarium $m$ is arranged in the rear compartment and a bowl or aquarium $m^1$ of like character containing fish is arranged in the front compartment. Upon illuminating the compartments alternately it will appear to the observer at the sight opening that a fish is alternately present and absent from the same bowl. A like illusion can be produced by the use of two vases $m^2$, $m^3$ arranged in the respective compartments one containing flowers and the other none, as shown in Fig. 13, the flowers seemingly appearing and disappearing from the same vase as the compartments are lit up alternately. In Fig. 12 two cages $m^4$, $m^5$ are arranged in the compartments one being empty and the other containing a bird which latter may be made to appear and disappear to the spectator by alternately lighting the compartments.

If desired, the left part of the rear wall behind the glass and the front part of the right wall may be withdrawn and the faces of different persons may be placed therein in which case alternate illumination of the compartments produces the impression on the person gazing in the sight opening as if the faces of the persons at the side and rear openings of the casing were changing from one to the other at the same place. Instead of placing faces at the openings in the casing within range of the glass part of the partition, any other article may be placed there and be made to appear and disappear.

When used in the above described manner, this illusion device serves as a toy or magic box for amusement and entertainment but when it is desired to use the same for advertising purposes, as for instance in a store window, the price and description of an article may be placed in one compartment and the article referred to in the other compartment within range of the glass part of the partition, the description and article apparently appearing and disappearing in view of the spectator as the compartments are lighted alternately.

When electric lamps are employed for illuminating the compartments the operation of the same may be controlled by various means to produce different effects. For instance, as shown in Fig. 5, the lamps L, $L^1$ may be connected in parallel and each turned on or off by means of a hand operated switch $n$ of any suitable construction. If desired, a hand operated adjustable resistance $n^1$ may be included in the circuit of each lamp, as shown in Fig. 6.

Instead of turning the lamps on and off by hand this may be done automatically in various ways, for instance, as shown in Fig. 7, in which the lamps are in parallel on the lighting circuit and each has a lamp connected in series therewith, a thermostatic switch $o$ is provided with a heating coil $o^1$ which operates to automatically open and close the circuit through the respective lamp. As the coil $o^1$ becomes heated above a predetermined temperature the movable contact of the switch $o$ connected with the same is disengaged from the companion stationary contact and when the coil $o^1$ has again cooled sufficiently the movable contact of the switch $o$ is engaged with the stationary contact. By this means the electric circuit is alternately opened and closed and the lamps lighted and extinguished. The electrical connections in Fig. 8 show the two lamps in series, L being of high candle power and $L^1$ of low candle power, and from a point between these lamps a short circuit extends to the side of the lighting circuit which connects with the lamp $L^1$, said short circuit containing a thermostatic switch $o^2$. As the support of the movable contact of the switch $o^2$ becomes heated above the normal the movable contact is disengaged from its companion stationary contact and when said support again cools sufficiently, the contact carried by the same is again engaged with its companion stationary contact. When the contacts of the switch $o^2$ are closed the lamp $L^1$ is short circuited allowing the lamp L to burn at full brilliancy but when this switch is opened the two lamps operate in series relatively to the lighting circuit causing the low candle power lamp $L^1$ to burn with increasing brilliancy and the high candle power L to be reduced to a dull red glow on account of the high resistance of the low candle power lamp $L^1$ being thrown in series with it.

A double thermostatic switch $p$ may be used for alternately lighting lamps L, $L^1$ as shown in Fig. 9. This switch has a stationary contact for each lamp L, $L^1$ connected with one side of the circuit and a movable contact connected with the other side of the circuit and adapted to be engaged alternately with the stationary contacts as the temperature of its support passes above or below normal, thereby opening and closing the circuits through the lamps alternately. This thermostat is placed on one side of the partition so that the heat in the compartment operates the thermostat.

When the alternate lighting of the compartments is effected quickly the change in appearance of the object in the casing also occurs quickly, but when the light in one compartment is diminished gradually while the light in the other compartment is increased in the same measure, the object in the former gradually disappears or fades away while that in the latter gradually becomes more distinct beginning with a phantom-like image and gradually growing more distinct until complete transition has been effected.

The modification of my improved illusion device shown in Figs. 10, 11, 12 and 13 is constructed as follows:—Q, R represent the rectangular top and bottom of the casing which are provided respectively with marginal flanges or rims $q$, $r$ which project toward each other and in the normal assembled position of the parts, as shown in Figs. 10 and 13. The front, right, left and rear walls $s$, $s^1$, $s^2$, $s^3$ engage at their upper and lower edges with the top and bottom inside of their flanges and are connected together at their opposing vertical edges by flexible hinges $t$, so that when these walls are removed from the top and bottom they may be folded compactly, as shown in Fig. 11, for storage or transportation. The diagonal partition U in this case consists of a single piece of glass extending continuously from the left front corner to the rear right corner of the casing, the left part $u$ thereof opposite the sight opening being transparent while the right part $u^1$ is covered on one or both sides with black paper $u^2$ or other material to render the same opaque. The right wall and rear wall are provided with openings $v$, $v^1$ for the insertion of hand lights in either compartment and the top is provided on opposite sides of the right part of the partition with openings $w$, $w^1$ in which are detachably secured electric lamps L, $L^1$ which may be turned on and off either automatically or by hand the same as in the construction previously described.

I claim as my invention:

1. An optical illusion device comprising a casing, and a diagonal transparent partition arranged in the casing and dividing the same into front and rear compartments, said casing having a sight opening in front of said partition and light openings through which a light may be inserted from the outside for illuminating said compartments alternately, said light openings being arranged in the rear wall and in that side wall which is next to the rear end of the partition.

2. An optical illusion device comprising a rectangular casing, a diagonal partition arranged in the casing and consisting of a transparent front section which engages at its front end with one of the front corners of the casing and an opaque rear section engaging at its rear end with the diagonally opposite rear corner of the casing and provided at its front end with a vertical channel which receives the rear end of the transparent section, said casing having a sight opening in front of the transparent part of the partition, and means for illuminating the compartments in the casing on opposite sides of the partition.

3. An optical illusion device comprising a casing having a top, a bottom, a front wall, side walls, and a rear wall, said walls being slidably connected with the top and bottom and said side and rear walls being each constructed of a plurality of sections, and a partition having a transparent part and arranged diagonally in said casing those sections of the rear and side walls diagonally opposite the transparent part of the partition being removable so as to form openings in these parts of the walls through which objects arranged opposite these openings on the exterior of the casing may be visible on the interior of the same.

Witness my hand this 6th day of June, 1908.

FRANK C. PERKINS.

Witnesses:
THEO L. POPP,
ANNA HEIGIS.